//  Patented Dec. 12, 1950

2,534,190

UNITED STATES PATENT OFFICE 2,534,190

HEAT-RESISTANT STEEL ALLOY

Bohumil A. Zikmund, Munster, Ind., assignor to Calumet Steel Castings Corporation, Hammond, Ind., a corporation of Indiana No Drawing. Application September 10, 1949, Serial No. 115,117

3 Claims. (Cl. 75—128)

My invention relates generally to steel alloys and, more particularly, to those steel alloys which are heat resistant.

Such steel alloys are particularly useful as supporting or conveying structures, or parts thereof, adapted to be employed in high temperature furnaces, such as furnaces used for annealing or heat treatment. The supporting and conveying structures or parts may comprise grids, piers, tracks, trays, baskets, racks, bucks, conveyors, conveyor chains and similar parts such as are used in so-called car-bottom and box-type furnaces.

It is the primary object of my invention to provide a steel alloy that has heat resistant properties and which retains those properties throughout a long period of use.

It is another object of this invention to provide a steel alloy which is resistant to destruction and distortion by being subjected alternately to high and low temperatures.

It is another object of this invention to provide a steel alloy such as referred to in the paragraphs immediately above, which has uniform characteristics when it is constituted as hereinafter set forth, and is therefore adaptable to being employed for the construction of supporting and conveying structures which are used in high temperature furnaces.

In practicing my invention, I employ as alloying ingredients carbon, silicon, manganese, chrome and nickel. These elements are employed in relatively narrow ranges together with carbon in the range noted, the balance being substantially iron:

| Element: | Per cent |
|---|---|
| Carbon | 0.40–0.50 |
| Silicon | 1.00–1.25 |
| Manganese | 1.00–1.25 |
| Chrome | 0.75–1.00 |
| Nickel | 3.00–3.50 |

Using alloying ingredients in these ranges and conventional steel making methods, I have made castings having high resistance to heat and capable of withstanding great variations in temperature, such as may be encountered in high temperature furnaces such as are employed for metal heat treating purposes. As noted heretofore, such castings can be employed as supports for conveyors or as conveyors or parts thereof, stationary racks, baskets, trays, grids, bucks, piers, and the like, and may be disposed in localities where they are subjected directly to the furnace heat.

In the charge employed for each heat there is employed principally scrap steel with necessary alloy additions. Such scrap steel may contain some alloying ingredients which are relatively insignificant and do not modify the desired characteristics of the resultant metal.

Using the procedure indicated above and the same properties of scrap steel, alloys and time cycle, I have produced castings in one heat, an analysis of which reveals the following, in addition to iron:

| Elements: | Per cent |
|---|---|
| Carbon | 0.45 |
| Silicon | 1.04 |
| Manganese | 1.18 |
| Chrome | 0.87 |
| Nickel | 3.35 |

The metal from that heat has operated very satisfactorily for the desired purposes indicated above.

I claim:

1. A heat resistant steel alloy adapted to withstand intense and continuous heating and extreme variations in temperature, said alloy comprising about 0.40% to 0.50% carbon, 1.00% to 1.25% silicon, 1.00% to 1.25% manganese, 0.75% to 1.00% chrome, 3.00% to 3.50% nickel, and the balance substantially all iron.

2. A heat resistant steel alloy adapted to withstand intense and continuous heating and extreme variations in temperature, said alloy comprising about 0.45% carbon, 1.04% silicon, 1.18% manganese, 0.87% chrome, 3.35% nickel, and the balance substantially all iron.

3. As a new article of manufacture, a heat resistant supporting element adapted to be employed in high temperature furnaces as a support for conveyors, containers, and the like, comprising about 0.40% to 0.50% carbon, 1.00% to 1.25% silicon, 1.00% to 1.25% manganese, 0.75% to 1.00% chrome and 3.00% to 3.50% nickel, and the balance substantially all iron.

BOHUMIL A. ZIKMUND.

REFERENCES CITED

The following references are of record in the file of this patent:

FOREIGN PATENTS

| Number | Country | Date |
|---|---|---|
| 83,074 | Austria | Mar. 10, 1921 |